US006720089B2

(12) United States Patent
Nemchock

(10) Patent No.: US 6,720,089 B2
(45) Date of Patent: Apr. 13, 2004

(54) DECORATIVE ARCHITECTURAL TITANIUM PANELS AND METHOD OF FABRICATION THEREOF

(75) Inventor: Gary Nemchock, Lawrence, KS (US)

(73) Assignee: Architectural Titanium LLC, Lawrence, KS (US)

(*) Notice: Subject to any disclaimer, the term of this patent is extended or adjusted under 35 U.S.C. 154(b) by 0 days.

(21) Appl. No.: 10/074,977

(22) Filed: Feb. 12, 2002

(65) Prior Publication Data

US 2003/0152798 A1 Aug. 14, 2003

(51) Int. Cl.[7] ............................ B32B 3/00; B32B 7/00; B32B 15/04; C22C 14/00

(52) U.S. Cl. ......................... 428/660; 428/33; 428/627; 428/663; 428/632; 428/45; 428/49; 428/81; 428/101; 428/121; 428/124; 428/192; 428/409; 148/421

(58) Field of Search .......................... 428/660, 14, 661, 428/663, 627, 632, 687, 33, 639, 640, 629, 45, 47, 48, 49, 81, 83, 101, 119, 121, 124, 126, 130, 192, 409, 699, 700, 701; 148/421; 420/417

(56) References Cited

U.S. PATENT DOCUMENTS 4,263,375 A * 4/1981 Elrod ......................... 428/594
5,113,681 A * 5/1992 Guesnon et al. ............... 72/53
6,103,391 A * 8/2000 Hirayama ................... 428/544
6,106,955 A * 8/2000 Ogawa et al. .............. 428/469
6,232,573 B1 * 5/2001 Fukai et al. ........... 219/121.14
6,451,129 B2 * 9/2002 Sato et al. .................. 148/237

FOREIGN PATENT DOCUMENTS

GB 2006518 * 5/1979

* cited by examiner

*Primary Examiner*—Michael LaVilla
(74) *Attorney, Agent, or Firm*—Hovey Williams LLP

(57) ABSTRACT

Titanium architectural panels (20) are provided which have recrystallized surface portions on at least the outer surface (22) thereof to give a decorative appearance to the panels (20). Surface recrystallization is obtained by subjecting the panels (20) to multiple oven heating steps ($H_1$, $H_2$) with intermediate cooling steps ($C_1$, $C_2$), wherein during each heating step ($H_1$, $H_2$) maximum temperature ranges ($T_{H1}$, $T_{H2}$) are established and maintained for predetermined periods. The intermediate cooling steps ($C_1$, $C_2$) involve injection of an inert cooling gas (e.g., argon) into the oven to rapidly lower the temperature to minimum temperature ranges ($T_{L1}$, $T_{L2}$). Preferably, the individual panels (20) are framed using molybdenum frame assembly (42), and are then suspended on a graphite and molybdenum hanger assembly (72).

10 Claims, 5 Drawing Sheets

DECORATIVE ARCHITECTURAL TITANIUM PANELS AND METHOD OF FABRICATION THEREOF

BACKGROUND OF THE INVENTION

1. Field of the Invention

The present invention is broadly concerned with decorative architectural panels formed of heat treated titanium, as well as methods of forming such panels and improved fixturing permitting the heat treatment of multiple panels without warpage or distortion thereof. More particularly, the invention is concerned with such panels which are subjected to multiple, controlled heating and cooling steps so as to recrystallize the titanium surface to give a pleasing, faceted appearance; preferably, the relatively large architectural panels are individually framed before heat treatment so as to resist unwanted edge distortions.

2. Description of the Prior Art

Titanium is a relatively light, silver-gray metal with a specific gravity of 0.163 lb/in$^3$. Pure titanium has a high melting point (3035° F.) and a lower coefficient of expansion and lower thermal conductivity than either steel or aluminum alloys. Its modulus of elasticity ($1.1\times10^{11}$ Pa) is midway between that of steel and aluminum.

Titanium is allotropic, and up to a temperature of 1625° F., titanium atoms are in a hexagonal close-packed alpha crystal array. When titanium is heated above the transition temperature of 1625° F., the atoms rearrange themselves into a body-centered cubic beta structure.

Commercially pure titanium is similar in physical properties to steel. However, by addition of other elements, the resultant titanium alloys are converted to materials having unique characteristics, including high strength and stiffness, corrosion resistance and usable ductility. The type and quantity of alloy addition determines the mechanical and, to some extent, the physical properties of titanium.

Commercially pure titanium and its alloys are used in the aerospace industry and in other contexts where corrosion resistance is required. Titanium's corrosion resistance is based upon its reactive nature, i.e, it has the ability to form, upon exposure to the atmosphere, a tight, tenacious oxide film that is resistant to a wide variety of media which would corrode other metals. Thus, titanium is resistant to chlorides and oxidizing agents such as nitric acid, and is immune to environmental corrosion.

It is known that heat treatment of relatively small pieces of substantially pure titanium can create surface changes giving a pleasing, decorative, faceted appearance. For example, U.K. Patent No. 1,175,355 describes the surface treatment of titanium, in the context of decoration of deep drawn thimbles. In this process, the titanium objects are heated either under vacuum or in an inert gaseous atmosphere at a temperature of 900–1200° C. for at least five minutes to cause grain enlargement and a faceted surface effect. Thereafter, the heat-treated titanium is subjected to an anodizing process. Swiss Patent No. 513,012 is also directed to the heat treatment of small titanium objects.

While surface decoration of such small titanium items is known, no processes have been developed for surface recrystallization of large sheet-like members such as architectural panels. Direct adoption of the prior art techniques described above is entirely unsatisfactory, owing to the fact that the heat treatment tends to substantially warp the larger panels to the point that they are rendered unusable.

There is accordingly a need in the art for improved processes and products whereby large sheet-type architectural and similar panels can be provided. Such decorative panels could be used as the facia cladding of buildings and other structures, to provide not only a pleasing aesthetic appearance, but also to give a highly durable, corrosion resistant exterior.

SUMMARY OF THE INVENTION

The present invention overcomes the problems outlined above and provides relatively large architectural panels or sheets which are designed for, e.g., attachment to the exterior surfaces of buildings or other structures; the panels are treated to give various stages of recrystallization to thereby create visually impressive aesthetic designs. Broadly speaking, such panels are generally quadrate in configuration and are formed of substantially pure (normally at least 99% pure) titanium. Moreover, they have a length or width dimension of at least about 3 inches, and preferably substantially larger (on the order of at least about 24 inches), with at least one face of the panel being heat-recrystallized and having an oxidation coating over the recrystallized face. Under certain processing conditions, the panels may also assume an undulating shape which further increases the aesthetic effect.

In terms of the heat treatment method, it has been found that the architectural panels must be subjected to multiple, controlled oven heating steps with intermediate cooling between the heating steps so as to effect the desired grain growth and recrystallization of surface portions of the panel. During such multiple heating steps, at least a portion of the circumscribing margin of the panel is restrained, preferably through the use of a frame disposed substantially around the margin to inhibit moving thereof during heating. The frame normally includes a plurality of interconnected frame members cooperatively extending about substantially the entirety of the panel margin, with the frame members being formed of a material different than titanium and preferably selected from the group consisting of high temperature ceramics and molybdenum. In order to further rigidify the panel and frame assembly, stiffening elements may be inserted proximal to the corners of the panel, preferably adjacent the rear surface thereof.

The heating steps are preferably carried out under vacuum conditions typically on the order of $10^{-3}$ to $10^{-5}$ torr. The particular heating regimen employed is variable depending upon the size of the panel and the desired surface decoration. Generally speaking though, the multiple heating steps involve relatively rapid heating up to a maximum temperature range above the transition temperature of the titanium, whereupon this maximum temperature range is maintained for a period of time. Where two heating steps are employed, the second maximum temperature range is normally somewhat lower than the first maximum temperature range, but the second range is maintained for a substantially longer period of time as compared with the first time period.

Intermediate cooling on the other hand preferably includes the step of injecting an inert cooling gas into the oven, with argon being very suitable for this purpose. After a minimum temperature range is reached using inert gas cooling, the gas is removed and vacuum conditions reestablished for the next heating step.

After the recrystallization multiple heating steps are concluded, the panels may then be oxidized in air if an interference color is desired. Different time-temperature heating in air produces different types and intensities of coloration on the panels, which can be controlled for predetermined effect.

During fabrication, individual panels are first framed and are then suspended in spaced relationship from each other using a graphite and molybdenum hanger assembly. The entire hanger assembly with installed framed panels is then placed within a heating oven for recrystallization heating and oxidation.

DETAILED DESCRIPTION OF THE PREFERRED EMBODIMENT

The preferred apparatus for use in preparing the decorative titanium panels of the invention is illustrated in FIGS. 1–9. In particular, the goal is to provide a plurality of titanium panels 20 of desired size for an architectural application. Generally speaking, such panels will be substantially quadrate in plan configuration, and would typically have a minimum length or width dimension of at least about 3 inches and a thickness of from about 0.005–0.250 inches; more preferably, the panels are substantially square or rectangular and would have a minimum length or width dimension of at least about 12 inches (and most preferably at least about 24 inches), and a thickness of from about 0.020–0.125 inches. The panels 20 are formed of substantially pure titanium, usually commercial Grades 1–4. The most preferred titanium is a Grade 1 material having mechanical properties specified in ASTM B265, with the following ingredients apart from titanium: oxygen equivalent, 0.05–0.10 (aim 0.075); hydrogen, 0.015 max; oxygen, 0.07 max; carbon, 0.02 max; iron, 0.07 max; nitrogen, 0.012 max; other elements, each, 0.10 max; and other elements, total 0.30 max.

The factory-delivered titanium material used in the fabrication of the panels 20 usually has been acid-pickled using a mixture of hydrofluoric and nitric acids, followed by a rinse with distilled water and a squegee/air knife treatment. The material has a PVC film applied to one face, and is coiled for shipment. At the fabrication site, the titanium is cut to size, the PVC film is removed, and fabricated as described in detail hereafter.

Figure 2:
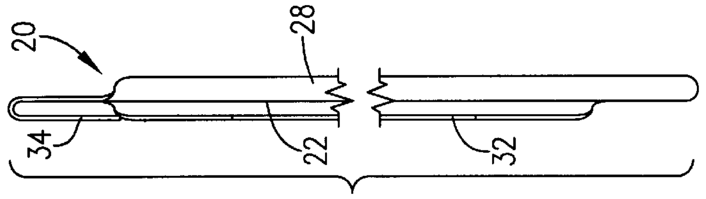
FIG. 2 is a fragmentary side elevational view of the righthand margin of the panel depicted in FIG. 1.
Figure 1:
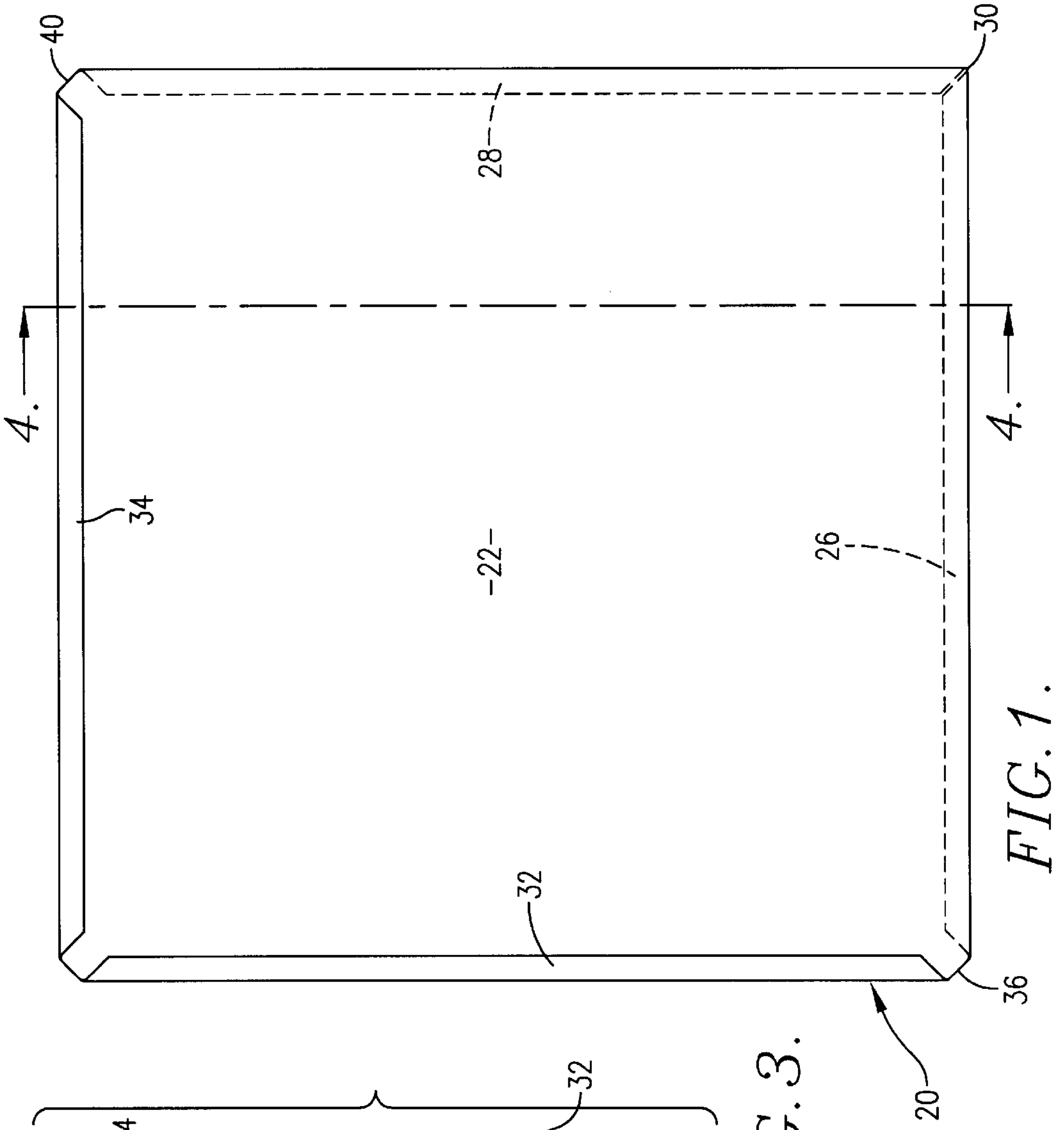
FIG. 1 is a plan view of a preferred, decorative architectural titanium panel in accordance with the invention, illustrating the reverse-bend marginal attachment flanges of the panel.
Figure 3:
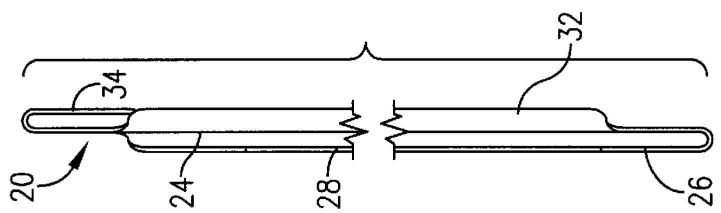
FIG. 3 is a fragmentary side elevational view of the lefthand margin of the panel depicted in FIG. 1.
Figure 4:
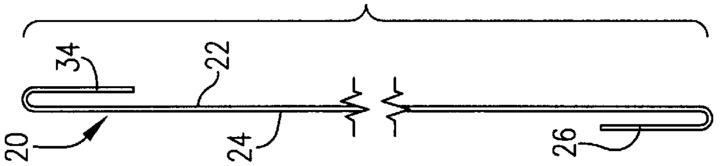
FIG. 4 is a vertical sectional view taken along line 4—4 of FIG. 1 and illustrating the upper and lower reverse bend marginal attachment flanges.

Referring to FIG. 1, it will be seen that the exemplary panel 20 is substantially square in plan configuration presenting a front surface 22 and an opposed rear surface 24. The panel is equipped with four reverse-bend marginal flanges, namely rear surface flanges 26 and 28 which are in adjacency at sharp corner 30, as well as front reverse-bend flanges 32 and 34. It will be observed that the remaining three corners 36, 38, 40 of the panel 20 are oblique. The flanges 26, 28 and 32, 34 are designed so as to permit interengagement and attachment of the panels 20 on the exterior surface of a building or the like.

Figure 9:
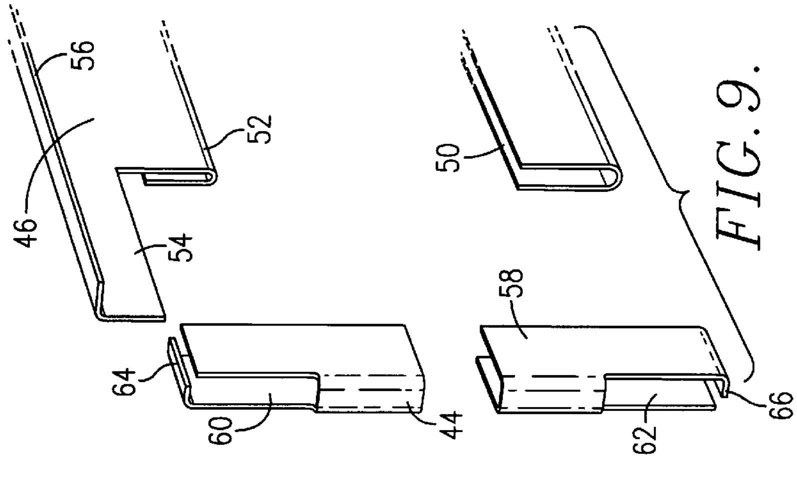
FIG. 9 is a fragmentary exploded perspective view illustrating the preferred construction of the frame elements and the method of interconnection thereof.
Figure 6:
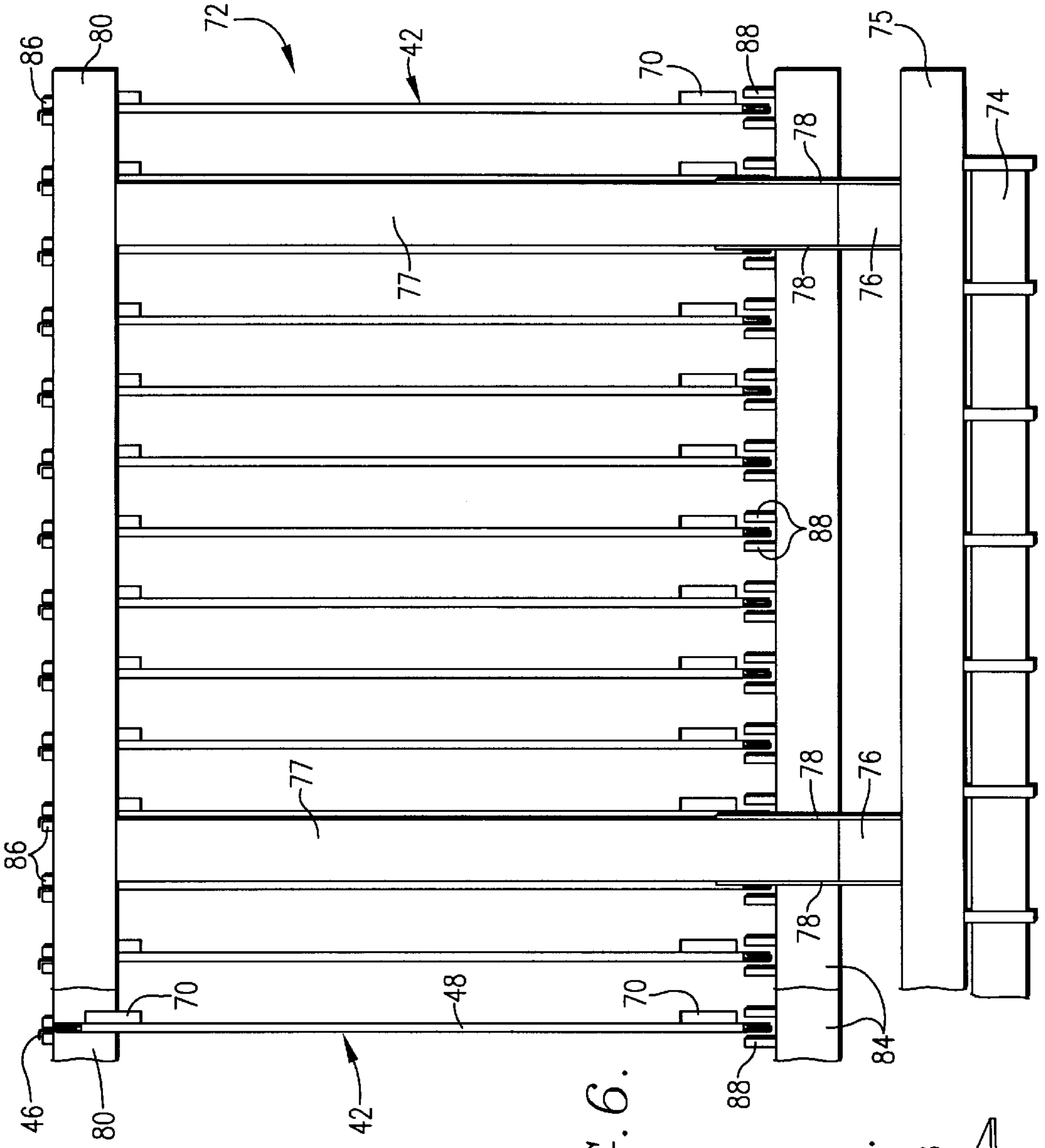
FIG. 6 is a side elevational view of the multiple-panel assembly of FIG. 5.
Figure 7:
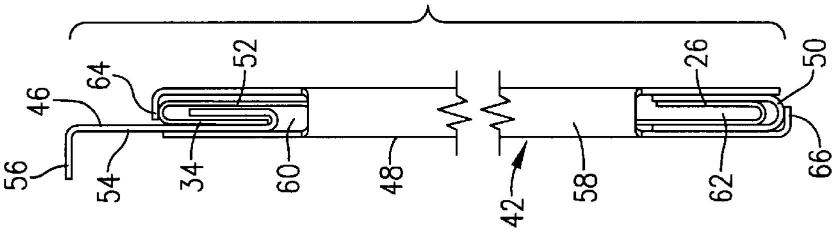
FIG. 7 is a fragmentary side view of one of the framed titanium architectural panels supported on the multiple panel assembly of FIGS. 5 and 6.
Figure 8:
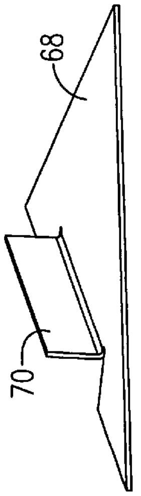
FIG. 8 is a perspective view of one of the preferred corner gusset stiffening elements used as a part of the frame for each architectural panel.

In order to prepare the panels 20 for heat treatment in accordance with the invention, they are first placed within a frame assembly 42 made up of four interconnected molybdenum frame elements 44, 46, 48 and 50 which frictionally engage corresponding side margins of the panel 20 as well as the flanges 26, 28, 32, 34. Referring specifically to FIG. 9, it will be seen that the uppermost frame element 46 includes a depending, U-shaped section 52 as well as laterally projecting, upper suspension segments 54 and an uppermost lip 56. The side marginal elements 44 and 48 are similarly constructed, and have a primary U-shaped body 58 with openings 60 and 62 at the upper and lower ends thereof, and upper and lower lips 64, 66 respectively. The lower element 50 is a simple U-shaped member as shown.

The frame elements are pressed over the corresponding side margins and flanges of the panel 20 by first inserting the free leg of U-shaped section 52 into the confines of upper panel flange 34 (see FIGS. 7 and 9), whereupon the lower element 50 is pressed over the lower flange 26. At this point the side elements 44 and 48 are slid over the lateral projections 54 and into engagement with flanges 32 and 28, so that a portion of the projections 54 extend through the openings 60 beyond the side frame elements 44 and 48. Simultaneously, the ends of the element 50 are received within the lower openings 62. Of course, the upper and lower lips 64 and 66 assist in preventing inadvertent dislodgement of the frame elements. The frame assembly 42 is completed by insertion of four generally triangular gusset plates 68 each having a handle 70 between the rear surface 24 of panel 20 and the adjacent sections of the frame elements, i.e., the triangular face of each gusset 68 is in contact with the rear surface 24.

The framed panels 20 are thus structurally self-sustaining and are ready for heat treatment. In this connection, use of the frame assemblies 42 is important in the manufacture of the finished panels, so as to avoid edge warpage or distortion. At the same time, use of such framing does not detract from the desirable surface recrystallization of front panel surface 22.

In order to better handle a plurality of the framed panels 20, use is made of a hanger assembly broadly referred to by the numeral 72. This assembly includes a lowermost metal (Inconel) grid-like support 74 having a pair of fore and aft extending, laterally spaced apart base beams 75 thereon. The beams 75 support laterally extending crossbeams 76 which in turn support and are connected to four uprights 77. In this respect, it will be seen that molybdenum connector plates 78 are employed to interconnect the crossbeams 76 and uprights 77. The upper ends of the uprights 77 support fore and aft extending beams 80. Finally, it will be observed that the crossbeams 76 also support a total of four, fore and aft extending beams 84. Preferably, the beams 75 and 76, uprights 77, and beams 80, 84 are formed of graphite. In addition, it will be seen that the upper beams 80 are equipped with a series of upstanding spacer pin pairs 86 and that the inboard lower beams 80 have a similar series of upwardly projecting pin pairs 88.

Figure 5:
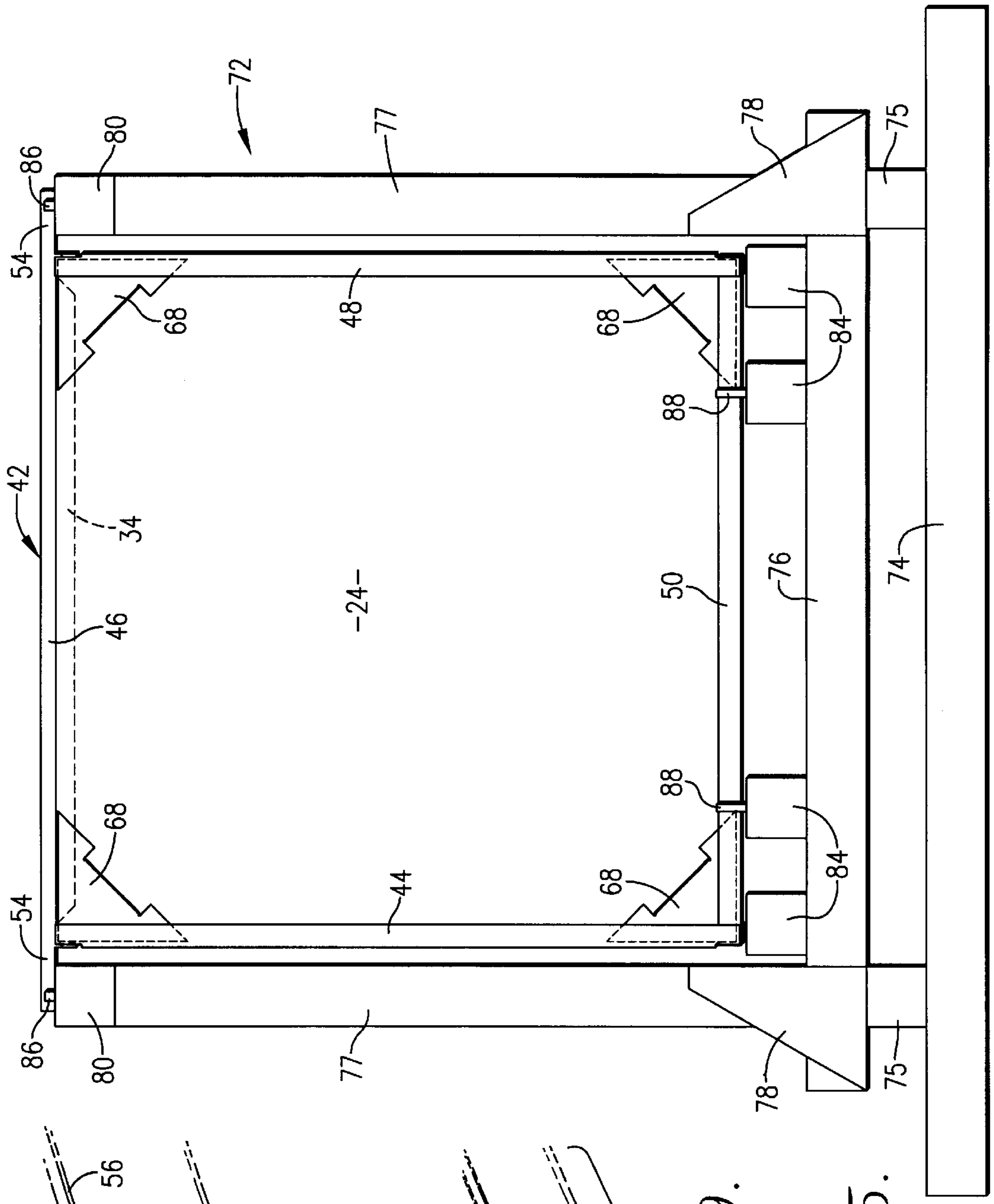
FIG. 5 is a front elevational view of a multiple-panel assembly used to support a plurality of individual titanium architectural panels during heat treatment thereof.

The framed panels 20 as individual panel units are supported on hanger assembly 72 by means of the laterally extending projections 54 of the upper frame elements 46. As best seen in FIG. 5, such projections rest atop the upper beams 80 so that the individual framed panels depend therefrom. Proper spacing of the framed panels is provided by means of the upper and lower pins 86, 88, i.e., the upper portion of each frame element 46 is located between a corresponding pin pair 86, while the lower frame element 50 (and thus the lower margin of the panel 20) is captively retained between a lower pin pair 88. Once all of the framed panels 20 are positioned on the hanger assembly, the entire assembly can then be placed within an appropriate oven or furnace for heat treatment.

The following example sets forth the steps employed in a preferred process for creation of decorative titanium architectural panels in accordance with the invention. It is to be understood, however, that this example is provided by way of illustration only and nothing therein should be taken as a limitation upon the overall scope of the invention.

Example

Figure 10:
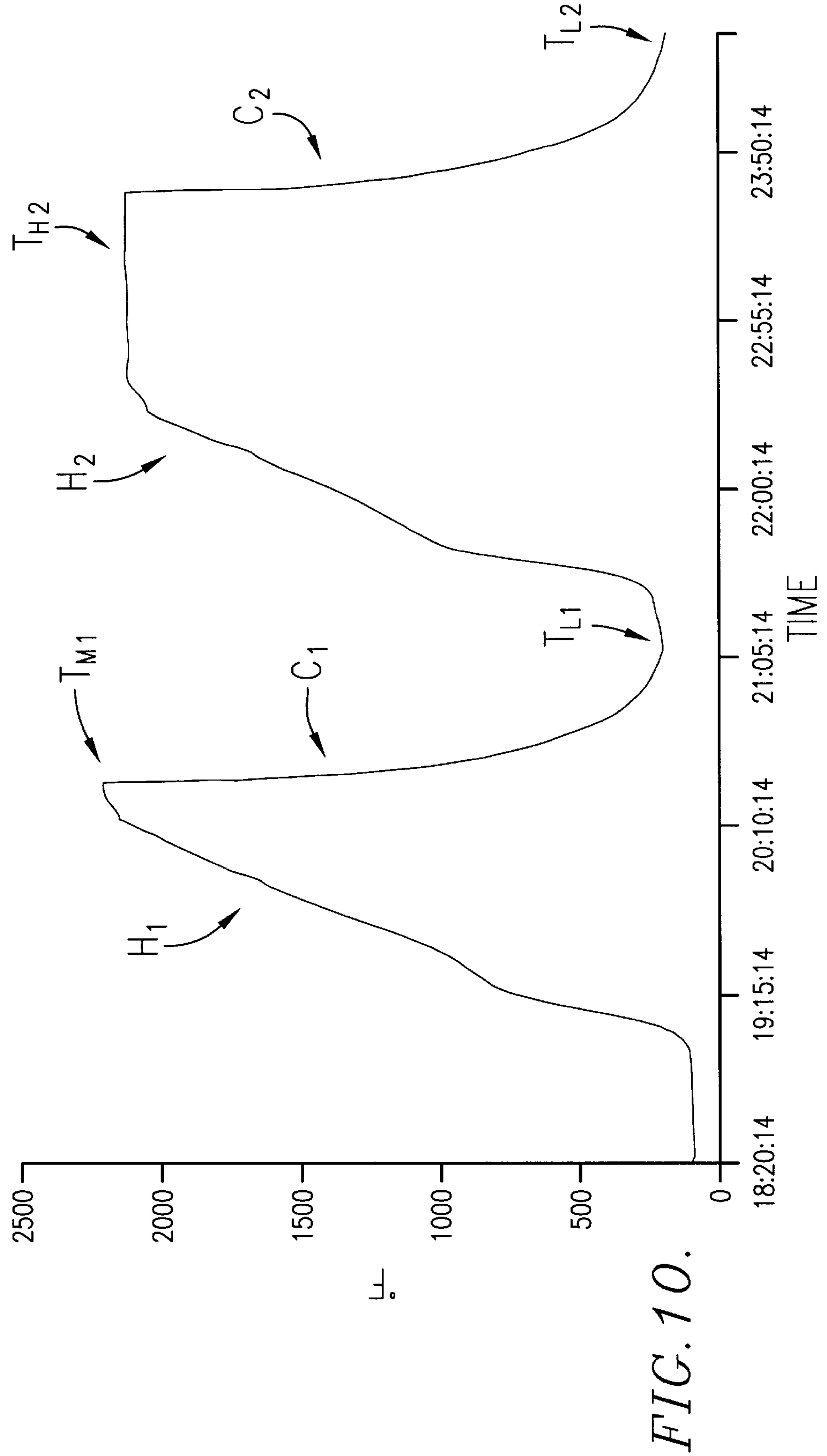
FIG. 10 is a graph of temperature versus time depicting an exemplary time-temperature profile during heat treatment of the titanium panels in accordance with the invention.

A total of 30 molybdenum-framed architectural panels 20 suspended from graphite hanger assemblies 72 were prepared as described above. The hanger assemblies 72 with the framed panels 20 in place were forklifted into a tubular electric oven for heat treatment. In the first step, the oven door was closed and the oven was evacuated to a level of about $10^{-4}$ torr over a period of about 10 minutes. At this point, the heating cycle was commenced to give first and second heating steps with an intermediate cooling step, sufficient to recrystallize the panels 20 (and particularly the front surfaces 22 thereof) for decorative effect. The time-temperature profile of this heat treatment is set forth in FIG. 10.

In particular, during the first heating step $H_1$, the temperature of the oven was rapidly elevated to achieve a first maximum temperature range $T_{H1}$ of 2000–2400° F., which was maintained for a period of about 5 minutes. At the end of this step $H_1$, the first cooling step $C_1$ was performed. This involved repressurization of the oven by injection of argon into the oven to achieve a pressure of 1–2 bar therein. This resulted in rapid oven temperature loss down to a first minimum temperature range of $T_{L1}$. This was accomplished over a period of 50 minutes to achieve a minimum temperature range of 200–250° F. Thereafter, the oven was again evacuated and a second heating step $H_2$ was carried out. This involved reheating the oven along the depicted profile to achieve a second temperature maximum $T_{H2}$ of 2000–2400° F., which was maintained for a period of 60 minutes.

At the end of the second heating step, argon was again injected during the second cooling step $C_2$, causing rapid oven temperature loss down to a second minimum temperature range $T_{L2}$ of 200–250° F. At this point, the oven was used to oxidize the panels. This involved introduction of ambient air into the oven followed by heating to a temperature of about 530° F. for a period of 60 minutes in order to form a tenacious oxidation layer over the titanium panels. At the end of this oxidation step, the oven was again cooled and the completed panels were then removed from the oven. The molybdenum frames were removed from each panel, and the latter were covered with protective PVC film material, ready for shipping and use.

Figure 11:
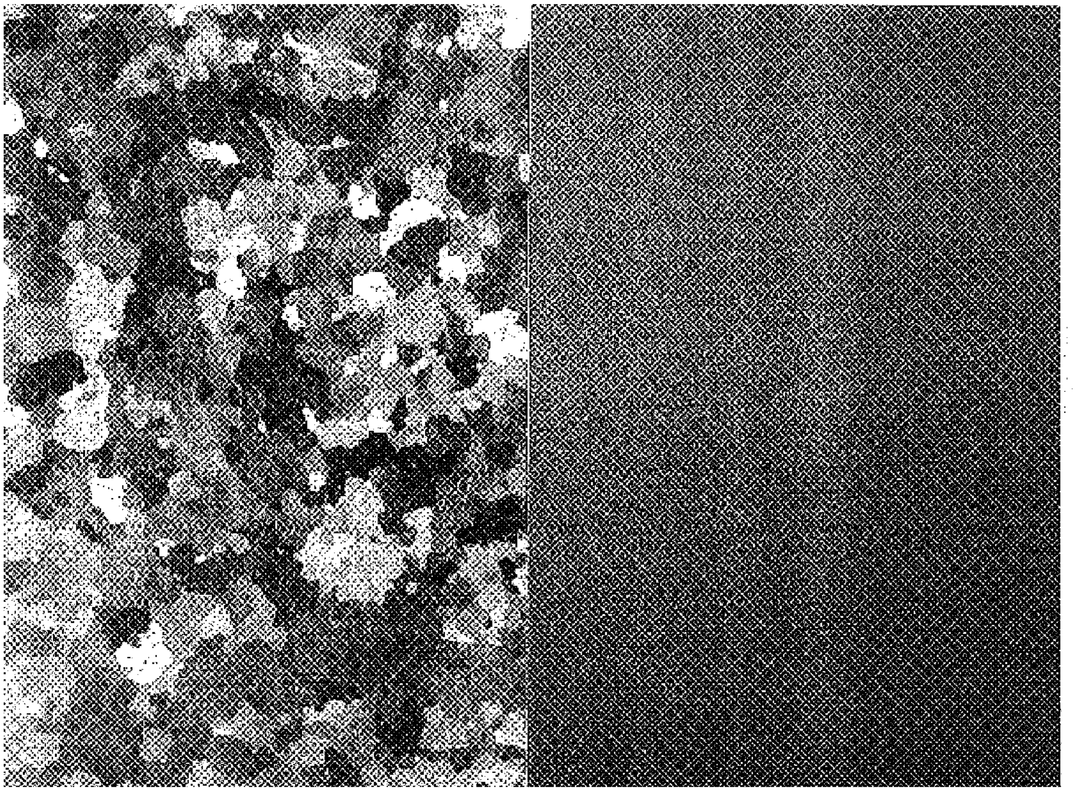
FIG. 11 is a comparative scanning electron microphotograph (SEM) illustrating a titanium sheet prior to heat treatment in accordance with the invention (right side of photograph) and a similar SEM depicting a titanium sheet after heat treatment (left side of photograph), showing the change in surface crystal structure from the heat treatment.

FIG. 11 is a comparative SEM depicting surface portions of an untreated titanium sheet and a sheet treated in accordance with the invention. As illustrated in the left side of the figure, the heat treatment effects a significant change in surface crystal structure which is responsible for the desirable aesthetic effect of architectural panels produced pursuant to the invention.

It will be appreciated that the recrystallization procedure can be carried out over a range of values in terms of maximum and minimum temperature ranges, heating and cooling rates, vacuum conditions and argon pressures, and that similarly the final oxidation step can be varied. The following table sets forth broad and preferred ranges for these steps.

TABLE

Recrystallization Treatment

| First Heating Step ($H_1$) | Broad Range | Preferred Range |
|---|---|---|
| Maximum Temperature Range (° F.) | 2000–2400 | 2100–2300 |
| Heating Rate (° F./min) | 15–40 | 20–30 |
| Vacuum Conditions (torr) | $10^{-3}$ to $10^{-6}$ | $10^{-3}$ to $10^{-5}$ |
| Maximum Temperature Range Maintenance (min) | 3–60 | 15–40 |
| First Cooling Step ($C_1$) | | |
| Minimum Temperature Range (° F.) | 75–300 | 200–250 |
| Cooling Rate (° F./min) | 35–80 | 40–60 |
| Argon Pressure (bar) | 0.75–3 | 1–2 |
| Minimum Temperature Range Maintenance (min) | 10–70 | 20–50 |
| Second Heating Step ($H_2$) | | |
| Maximum Temperature Range (° F.) | 1800–2400 | 2000–2300 |
| Heating Rate (° F./min) | 15–40 | 20–30 |
| Vacuum Conditions (torr) | $10^{-3}$ to $10^{-6}$ | $10^{-3}$ to $10^{-5}$ |
| Maximum Temperature Range Maintenance (min) | 30–180 | 40–80 |

TABLE-continued

| | | |
|---|---|---|
| Second Cooling Step ($C_2$) | | |
| Minimum Temperature Range (° F.) | 75–300 | 200–250 |
| Cooling Rate (° F./min) | 35–80 | 40–60 |
| Argon Pressure (bar) | 0.75–3 | 1–2 |
| Minimum Temperature Range Maintenance (min) | 10–70 | 20–50 |
| Oxidation | | |
| Temperature (° F.) | 400–700 | 475–575 |
| Time (min) | 40–90 | 50–70 |

I claim:

1. A titanium panel unit adapted for heat treatment in order to form a decorative, recrystallized area on the titanium panel, said unit comprising:

a panel substantially quadrate in plan configuration and having an area to be decorated and a circumscribing margin about said area, said panel formed of substantially pure titanium; and a frame disposed substantially about said margin in order to inhibit movement of the margin during heat treatment, said frame comprising four frame elements interconnected to each other adjacent the corners of said quadrate panel, and in contact with said margin and formed of a material selected from the group consisting of high temperature ceramics and molybdenum, said frame further including stiffening elements secured to said frame proximal each of said corners.

2. The unit of claim 1, said stiffening elements comprising generally triangular gusset members in face-to-face contact with a surface of said panel remote from said area.

3. A multiple-panel assembly adapted for placement within an oven for heat treatment of the panels, said multiple-panel assembly comprising:

a plurality of titanium panel units adapted for heat treatment in order to form a decorative, recrystallized area on the titanium panel, each of said units comprising a panel having an area to be decorated and a circumscribing margin about said area, said panel formed of substantially pure titanium; and a frame disposed substantially about said margin in order to inhibit movement of the margin during heat treatment, said frame comprising frame elements in contact with said margin and formed of a material selected from the group consisting of high temperature ceramics and molybdenum; and a hanger assembly holding said panel units in generally aligned, spaced apart relationship.

4. The assembly of claim 3, each of said panels being substantially quadrate in plan configuration, each of said frames comprising four frame elements interconnected to each other adjacent the corners of a corresponding quadrate panel, said frame further including stiffening elements secured to the frame proximal to each of said corners.

5. The assembly of claim 4, said stiffening elements comprising generally triangular gusset members in face-to-face contact with a surface of each of said panels remote from the corresponding area.

6. The assembly of claim 3, said hanger assembly including a series of uprights supporting side marginal stringers, each of said units extending between and being supported by said side marginal stringers.

7. The assembly of claim 6, said uprights and stringers formed of graphite.

8. A decorative architectural panel comprising a generally quadrate panel formed of substantially pure titanium and having a minimum length or width dimension of at least about 3 inches and a circumscribing margin, at least one face of said panel being heat-recrystallized with an oxidation coating over said at least one face, said margin presenting four substantially rectilinear edges, each such edge defined by a reverse bend flange.

9. The panel of claim 8, two of said flanges being located adjacent one face of said panel, with the other two flanges located adjacent the opposite face of the panel.

10. The panel of claim 8, said panel presenting an undulating configuration between said circumscribing margin.

* * * * *